UNITED STATES PATENT OFFICE.

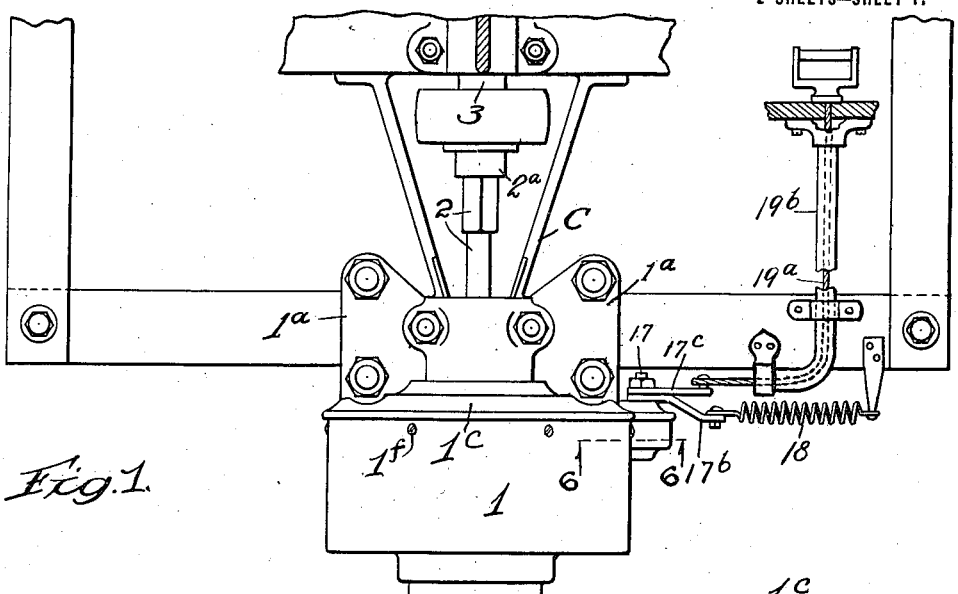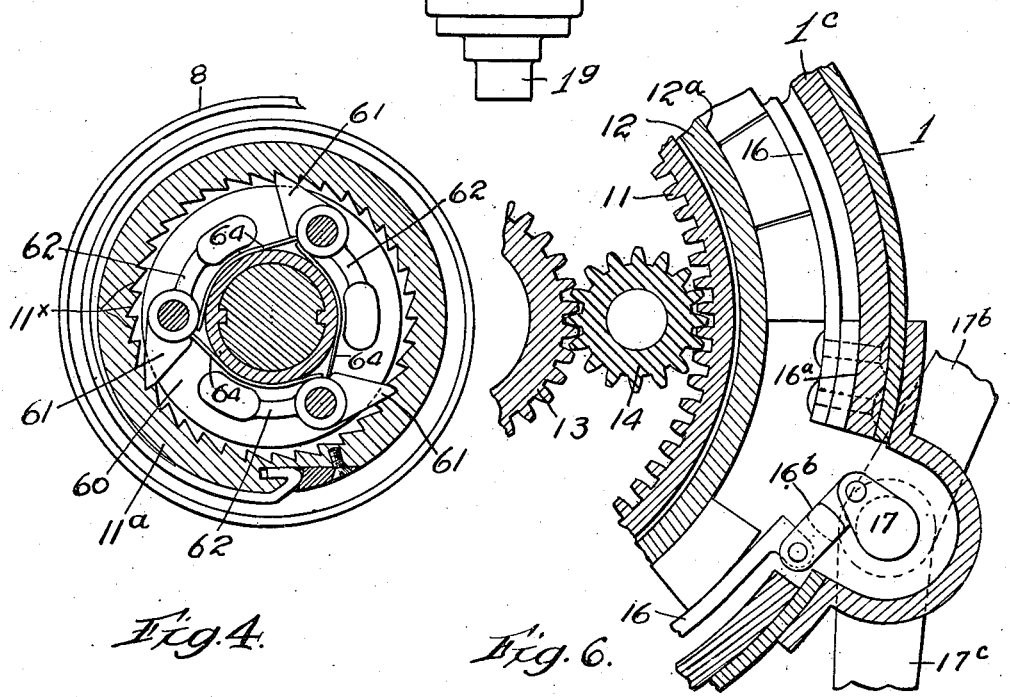

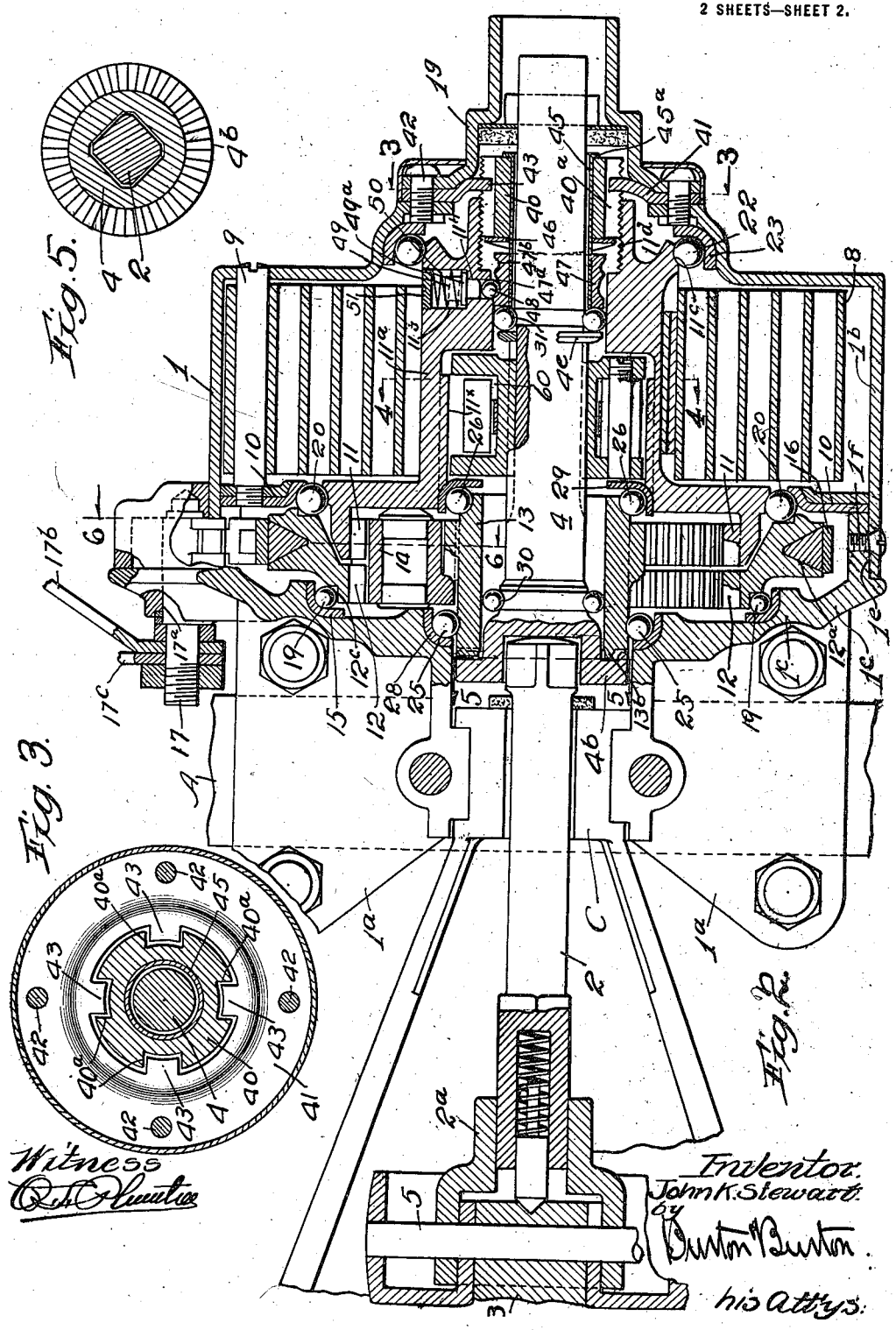

JOHN K. STEWART, OF CHICAGO, ILLINOIS; JULIA B. STEWART EXECUTRIX OF SAID JOHN K. STEWART, DECEASED.

SPRING-STARTER OF AUTOMOBILE-ENGINES.

1,252,626.　　　　Specification of Letters Patent.　　Patented Jan. 8, 1918.

Application filed February 9, 1916, Serial No. 77,341. Renewed May 28, 1917. Serial No. 171,597.

*To all whom it may concern:*

Be it known that I, JOHN K. STEWART, a citizen of the United States, residing at Chicago, in the county of Cook and State of Illinois, have invented new and useful Improvements in Spring-Starters of Automobile-Engines, of which the following is a specification, reference being had to the accompanying drawings, forming a part thereof.

The purpose of this invention is to provide an improved construction of spring starters for automobile engines. It consists in the elements and features of construction shown and described as set out in the claims.

In the drawings:—

Figure 1 is a plan view of the forward end portion of an automobile chassis and of the engine thereon equipped with a starter embodying this invention.

Fig. 2 is a horizontal axial section of the same.

Fig. 3 is a section at the line 3—3 on Fig. 2.

Fig. 4 is a section at the line 4—4 on Fig. 2.

Fig. 5 is a detail section at the line 5—5 on Fig. 2.

Fig. 6 is a section at the line 6—6 on Fig. 2.

In the structure shown in the drawings the starter casing, 1, is substituted for the mount usually positioned on the forward transverse frame bar of the chassis above the forward spring (indicated at A) for supporting the forward end or pivotal nose of the crank casing of the engine, and C represents that forward end of the crank casing lodged on the seat prepared for it in the rear end part of the starter casing. The starter casing is securely bolted to the chassis transverse frame bar by means of the horizontal flanges, 1ª, provided on said casing. A coupling shaft, 2, for connecting the engine shaft, 3, with the starter shaft, 4, has its rear end connected with the engine shaft by the socket head, 2ª, on the rear end of the coupling shaft, entering over the hub of the fan pulley and within the rim of the latter where said socket head is pinned fast to the engine shaft by means of the pin, 5, which customarily serves for securing the fan pulley and engaging the hand starter shaft, the pin being first withdrawn to admit said socket head, then replaced passing through holes in the socket head and securing it with some flexibility of connection, but permanently, to the engine shaft. The coupling shaft passes loosely through, but obtains no bearing in, the bearing aperture of the forward end, C, of the engine crank casing; and forward of that bearing it is loosely coupled for rotation with the starter shaft, 4, the coupling shaft having its forward end squared for engaging loosely in a square socket in the rear end of said starter shaft, which is journaled as hereinafter described in the starter casing which is rigid with the chassis as above described. The coupling shaft is thus carried loosely at both ends in shaft members which are each definitely positioned in bearings, all of which are on supporting structure which is rigid; and the coupling shaft may therefore be said to float on the two shafts which it connects for rotation. This looseness of connection serves to accommodate any inaccuracy in the axial alinement of the starter shaft with the engine shaft, said shafts, however, being designed to be alined as nearly as practicable in the mounting of the starter casing on the chassis by means described.

The starter casing comprises the rear member, 1ᶜ, rigid with the flanges by which the casing is mounted on the chassis forward bar as mentioned, and the forward member, 1ᵇ, which is telescoped with the rear member at 1ᵉ, where the two members are further secured rigidly together by screws, 1ᶠ. The several rotating parts of the starter mechanism are mounted by means of ball bearings, the outermost being thus carried directly on the casing, and each interior rotating part being journaled by ball-bearings on an exterior part, so that the engine-connected starter shaft, 4, which is at the center of the entire mechanism, floats on or in the exterior members and is supported by them instead of supporting them. This feature of construction which will fully appear from the further description tends to render the device very light running by relieving the fast running main shafts from all pressure bearings except that of their own and that which results from the work which they are performing.

The casing member, 1ᵇ, houses the power spring, 8, whose outer end is secured to that member by a bolt, 9, around which the spring is folded and which is anchored at one end in the outer or forward wall of the casing member, and at the other end in the steel bearing ring 10, which is forced tight into the rear end of said casing member, 1ᵇ, and forms also one side of a ball-race for ball bearings hereinafter more particularly described. The inner end of the power spring is secured to a drum extension hub or sleeve, 11ᵃ, of the driving gear, 11, of a planetary spring-winding train which comprises also the master gear, 12, held stationary by means hereinafter described, the prime driving gear member, 13, and the planet pinion, 14. The gears, 11 and 12, are internal gears. The master gear, 12, has one tooth more than the driven gear, 11. The planet pinion, 14, has half as many teeth as the planet-driving gear, 13, and the latter has half the number of the master gear. The planet pinion floats between the prime gear, 13, on the inside, and the master gear and final gear on the outside; that is, it is positioned and supported solely by its meshing engagement with these gears inside and outside of it respectively. For each revolution of the prime driving gear, 13, the planet pinion, 14, if it were not meshed with the master gear so as to be compelled to travel planet-wise around within the latter would make two revolutions about its own axis; but being compelled to make the planetary travel, it will in these two revolutions make one-half a planetary revolution in the same direction as the prime gear; so that the prime gear will in fact have to make one revolution and a half to give the planet pinion two revolutions about its axis; and said prime gear will therefore have to make three complete revolutions to cause the planet pinion to make one complete orbital movement around within the master gear. In one such complete orbital movement, the planet pinion meshing at all times both with the master gear and with the final gear which has one tooth less than the master gear, will force the final gear to make one tooth rotary movement relatively to the master gear which is fixed; that is to say, the final gear will advance in its rotation one tooth for every three revolutions of the prime gear. As illustrated, the planet pinion having sixteen teeth and the prime gear thirty-two teeth and the final driven gear sixty-four teeth, said final gear makes one complete revolution for every one hundred and ninety-two revolutions of the prime gear when that prime gear is being driven by the clutch connection described with the engine shaft; and it will therefore require one hundred and ninety-two revolutions of the engine shaft to make one spring winding revolution of the final gear, 11; and the power spring being constructed so as to be completely wound up in not less than three and not more than four complete turns of the winding shaft, it will require substantially 600 revolutions of the engine shaft to completely wind up the spring.

For producing this result it will be understood that the master gear, 12, is held stationary, the means provided for so holding it when the power spring is to be wound up, consists of a brake strap, 16, preferably of metal and of familiar construction for having the necessary flexibility, engaging a V-groove, 12ᵃ, in the periphery of the master gear. One end of the brake-strap is secured to the casing member, 1ᶜ, at 16ᵃ, and the other end is provided with a chain connection, 16ᵇ, for winding around a tightening shaft, 17, which is journaled at 17ᵃ, on the casing member, 1ᶜ, and is provided with a lever arm, 17ᵇ, to which there is attached one end of a spring, 18, whose other end is secured to any convenient point on the chassis frame, the spring being stretched from the lever arm to said fastening to a tension sufficient to cause the tightening shaft, 17, to draw the brake strap snugly into the V-groove of the master wheel, so that the slightest rotation of the latter in the direction for letting the power spring unwind, will cause the frictional grip of the brake strap to be tightened for holding the master wheel, 12. A second lever arm, 17ᶜ, of the tightening shaft, 17, is connected by any convenient means,—as the cable, 19ᵃ, extending in a guide tube, 19,—with a handle located at the dash-board for pulling on the lever arm, 17ᶜ, to rock the tightening shaft, 17, against the resistance of the spring, 18, causing relaxation of the grip of the brake on the master gear, the latter being elastic and normally disposed to expand to release it from the V-groove of the master gear.

Upon considering the organization of the train and clutch connections between the engine-connected shaft and the motor spring, it will be observed that when from any cause, as by back-firing or premature ignition in the engine, the engine shaft is reversely rotated, such reverse rotation will cause the entire planetary gear train to be rotated bodily in the direction for winding the power spring, such bodily rotation being possible because the master wheel, 12, will by rotation in that direction cause the brake engaged with the V-shaped groove, 12ᵃ, in the periphery of said wheel to be slacked or released. The winding of the spring which will occur in such a reverse rotation, it will be observed, being about six hundred times more rapid than will occur in the proper running of the engine, or the normal winding of the spring, will tend very strongly to check and will shortly stop the reverse rotation of the engine shaft, while at the same time the resistance of this spring being a yielding resistance will prevent the stoppage from imposing a severe shock upon the mechanism. Upon consideration it will be observed that this result is dependent upon the fact that relation between the elements of the planetary gear train are such that the final driven gear of that train, 11, when actuated through the medium of the train, revolves in the opposite direction from the prime gear, 13, of the train, and therefore in the opposite direction from the normal or forward rotation of the engine-connected shaft, taken in conjunction with the fact that the motor spring is wound and unwound from the same end.

The entire structure is designed with a view to journaling all rotating parts in roller bearings, balls being preferably employed as hereinafter specifically indicated.

The master gear, 12, is mounted in the casing member, 1$^c$, by means of ball bearings, 19, the outer member of the ball-race being formed by a steel ring, 15, forced into a seat provided for it in said casing member, 1$^c$, and the inner seat of the balls being formed at 12$^c$ on the back of the master gear.

The final driven gear, 11, is journaled in ball-bearings at 20, the balls being interposed between three members, viz., the steel ring, 10, forced into the mouth of the casing member, 1$^b$; the outer periphery of the final gear, 11, and the forward edge of the master gear, 12. Said final driven gear, 11, has another ball bearing indicated by the balls, 22, provided for it at the end of its hub or sleeve, 11$^a$, which constitutes the drum to which the inner end of the power spring is secured as above mentioned. The outer member of the ball-race at this bearing is formed by the steel ring, 23, forced into a seat provided for it in the forward reduced end of the casing member, 1$^b$, the opposite or inner member of the race being formed at 24 by the forward outer corner of the hub or drum, 11$^a$. These two longitudinally separated bearings of the gear, 11, give it the desirable support for carrying the stress of the power spring which is secured to it between said longitudinally separated bearings.

The prime driving gear, 13, it will be noticed, is a sleeve through which the engine connected starter shaft member 4, extends. Said gear, 13, is journaled in the casing member, 1$^c$, by ball-bearings at 25, and in the final driven or spring-connected gear, 11, by ball-bearings at 26. Balls at the bearings, 25, have their outer race formed by the ring, 28, forced into a seat provided for it in the casing member, 1$^c$; and the balls at the bearing, 26, have a race formed by the ring, 29, forced into the gear, 11. The engine-connected starter shaft, 4, has ball-bearings at 30 and 31. The former afford said shaft a seat within the prime driving gear, 13, and the latter affords a bearing within the final driven gear, 11.

Upon considering these several ball bearings on which the parts are successively supported in the case and in each other, it will be observed that their arrangement and distribution is such as to cause the pressures to be transmitted very directly in radial lines, the successively exterior bearings being as nearly as possible, and in fact very nearly, in direct trans-axial planes containing the respectively interior bearings. For example, it will be noticed that the ball-bearing, 25, is in the same trans-axial plane with the ball-bearing, 30, within it; that the other bearing of the prime gear, 13, at 26, is in the same trans-axial plane in the outer bearing, 20, of the final driven gear, 11, and that the bearing, 19, of the master gear, 12, in the casing is in a trans-axial plane intermediate between the plane of the bearings, 25 and 30, and the plane of the bearings, 20 and 26. This arrangement concentrating the principal bearings in a narrow trans-axial zone or belt so that the pressures are transmitted quite directly from within outward to the casing which is the final support, taken in connection with the feature above pointed out that the two bearings, 20 and 22, of the final driven gear, 11, are widely separated longitudinally, and that the two bearings of the engine-connected starter shaft, 4, at 30 and 31, respectively, are also widely longitudinally separated, and that the bearing of said starter shaft, 4, in the final driven gear, 11, is in a trans-axial plane intermediate between the planes of the two longitudinally-separated bearings of said gear, 11, in the casing, result in a desirable approximation to equalization of the pressure upon all the bearings, and avoidance of all lateral stresses which might tend to distort or cause undue concentration of pressure upon any bearing in case of looseness of any other bearing.

The winding up of the power spring, 8, by the running of the engine, rotating the engine-connected starter shaft, 4, through the medium of the coupling shaft, 2, is effected through the medium of the speed-reducing train above described beginning with the prime gear, 13, and ending with the final gear, 11, which has the drum to which the inner end of the spring is attached; and for this winding operation the engine-connected shaft, 4, is provided with means for clutching it to the prime gear, 13, consisting of a ratchet clutch head, 4$^b$, formed as a flange turning outwardly from the rear end of said engine-connected starter shaft, 4, and having its clutch teeth facing forwardly for engaging the rear end of the prime gear, 13, which, as above stated is a sleeve and has its rear end formed with co-operating ratchet teeth for engaging the forwardly-projecting ratchet teeth of the clutch head, 4$^b$.

Over-winding of the spring is prevented by means which will now be described for disengaging the two ratchet tooth members of the clutch connections above described. Said shaft, 4, is reduced in diameter commencing at a point a little forward of the bearing, 30, and extending thence to the forward end of said shaft. The forward end of the hub portion, 11$^a$, of the final driven gear, 11, is counterbored around the shaft, 4, and interiorly threaded as seen at 11$^d$. 40 is a sleeve which is exteriorly threaded and screwed into said interiorly threaded end of the hub, 11$^a$. This sleeve is held against rotation in the casing, or with respect thereto, by means of a disk, 41, which is bound between the forward end of the casing member, 1$^b$, and a terminal piece, 1$^g$, of said casing, which is bound onto the forward end of the member, 1$^b$, clamping the disk, 41, by means of bolts, 42, said disk being annular and having radial projections, 43, preferably three in number, from its inner circumference engaging a corresponding number of longitudinal key-ways or slots, 40$^a$, in the outer surface of the sleeve, 40, cutting across the threads thereof. On the reduced forward end portion of the shaft, 4, there is mounted a sleeve, 45, having its forward end flanged outwardly for engaging in front of the forward end of the threaded sleeve, 40, and having rigidly connected with it and carried by it on its rear end a sleeve, 47, between which and the rear end of the sleeve, 40, there is interposed a distorted disk, 46, operating as a spring reacting against pressure in an axial direction tending to flatten or straighten it, and tending thereby to hold the sleeve, 40, at the forward limit of a range of longitudinal movement on the sleeve, 45, that is, to hold it against said flange, 45$^a$. The sleeve, 47, at its rear end constitutes a forward portion of the ball-race for the ball bearings, 31, and presses against said balls, 31, in any rearward movement which may be given to the sleeve, 45, and said sleeve, 47, thereon. It will be observed that the balls, 31, have their interior race formed by a shoulder, 4$^e$, on the shaft, 4, so that rearward pressure upon said balls, 31, operates as pressure upon the shaft, tending to force it longitudinally rearward for disengagement of the clutch head, 4$^b$, from the rear ratchet-toothed end 13$^b$ of the prime driving gear, 13, of the planetary gear train. It will be understood that the construction thus far described would result in the clutch members, 4$^b$ and 13$^b$, being gradually forced out of engagement by the rotation of the final driven gear, 11$^a$, causing the sleeve, 40, to be screwed rearward with respect to and in the forward end of the hub of said gear, 11, and by means of the sleeve, 45, and the sleeve, 47, rigid therewith, pushing against the ball bearings, 31, and thereby against the shoulder, 4$^e$, in the shaft, 4, and pushing the latter rearward. If this action were permitted to occur in the gradual manner thus indicated, the points of the ratchet teeth of the members, 4$^b$ and 13$^b$, would be liable to be sheared off when in the near approach of disengagement the stress upon them of winding the spring to near its limit of tightness would exceed the shearing resistance of the teeth near their points; and in any event the disengagement would be effected in such a manner that the teeth would continue to click upon each other in the continued rotation of the shaft, 4, because there would be no means of carrying them farther apart after their disengagement actually occurred. These undesirable results are prevented by means of the spring, 46, above mentioned coöperating with a detent or semi-locking device operating upon the sleeve, 47, tending to resist its movement rearward under the crowding action of the sleeve, 40, until the energy stored up in the spring, 46, by the continued rearward movement of the sleeve, 40, is sufficient to overcome such resistance or partial locking. This detent device consists in the formation upon the outer circumference of the sleeve, 47, of an annular seat, 47$^a$, which accommodates a ball, 48, lodged in a radial aperture 11$^h$ formed in the hub, 11$^a$, of the gear, 11, said aperture being enlarged by counter-boring at the outer portion at 11$^j$ to accommodate a coiled spring, 50, within which there is a plunger, 49, having a flange, 49$^a$, which stops the inner end of the spring, and whose inner end beyond said flange bears upon the ball, 48, and transmits to it the pressure of the spring, 50, which is stopped at its outer end by a plug, 51, closing the counter-bore, 11$^j$. The annular seat, 47$^a$, slopes up steeply at its forward side nearly to the circumference of the sleeve, 47, where there is formed another annular seat, 47$^b$, shallower than the seat, 47$^a$, which affords a secondary lodgment for the ball, 48, after it has been forced up the incline leading to said secondary seat. It will be understood that the operation of this detent is to permit a slight gradual rearward movement of the sleeve, 47, under the pressure of the sleeve, 40, transmitted to the spring, 46, while the spring, 46, is being compressed because of the resistance of that movement presented by the steep slope of the seat, 47$^a$, in which the ball, 48, is lodged, and out of which it must be crowded against the resistance of the spring, 50, operating through the plunger, 49, on said ball, 48; and it will be understood that the energy stored in the spring, 46, by its compression during this slight rearward movement which the sleeve, 47, makes while the ball, 48, is being crowded up said steep slope, is sufficient to overcome the resistance of the engagement of the ball, 48, with said slope, said slope acting against the ball will crowd the latter suddenly outward against the resistance of the spring, 50, and the ball will become lodged in the secondary seat, 47ᵇ, while the shaft, 4, will be thrust suddenly rearward to a distance affecting complete disengagement of the clutch members, 4ᵇ and 13ᵇ.

When the brake is disengaged from the master gear to permit the spring to unwind for starting the engine shaft (by the clutch connections hereinafter described), the initial rotation of the final driven gear, 11, screwing the sleeve, 40, forwardly, causes the latter by engaging the flange, 45ᵃ, to draw the sleeves, 45 and 47, forward causing the detent device to resume its original position with the ball, 48, seated in the deeper annular groove, 47ᵃ, while the spring, 50, reacting on the shaft, 4, thrusts it longitudinally forward, reëngaging the two clutch members, 4ᵇ and 13ᵇ, while both are rotating at the same speed, leaving them in proper relation for effecting the rewinding when the operator, after the engine is well started applies the brake chain band, 16, for holding the master gear, so that the rotation of the engine shaft may again wind up the spring.

The driving connection between the starter shaft, 4, and the final gear member, 11, of the planetary gear train for causing the spring directly connected with said final gear member, 11, to communicate starting movement to the engine shaft, is effected by means of a clutch device comprising a peripherally chambered sleeve, 60, which is mounted on the shaft member, 4, and has a spline-and-groove connection therewith for sliding on and rotating with said shaft, or permitting the shaft to slide within said sleeve, which is in turn lodged within an annular cavity formed in the hub, 11ᵃ, of the gear, 11, within the portion thereof which constitutes the drum upon which the spring is secured and wound so that said clutch member lies directly within the encompassing spring. In the peripheral chamber of this peripherally chambered sleeve there are pivotally mounted a plurality of clutch dogs, 61, the head of each engaging with interiorly-projecting clutch teeth, 11ˣ, which are formed on the inner side of said drum, 11ᵃ, so that the dogs swing outwardly at their head or engaging ends for engagement with said clutch teeth of the drum. The clutch teeth, as well as the teeth which form the heads of the dogs, are ratchet shaped, that is to say, they have their engaging faces abrupt and the other faces sloping so as to ride out of engagement upon the driven member attaining a speed in the direction of which it is driven greater than that of the driving member. The driving member in this case being the drum, 11ᵃ, actuated by the spring in unwinding, and the driven member being the starter shaft, it will happen that when by the initial movement communicated by the unwinding of the spring the starter shaft starts the engine shaft and the latter begins to rotate under its own power and attains a rotation faster than that which is originally communicated by the unwinding action of the spring, the clutch dogs will be forced inward by the encounter of the sloping faces of the clutch teeth and disengaged from the latter. The clutch dogs are extended from their fulcrum in tails, 62, which are weighted so as to be heavier than the opposite ends of the dogs, with the result that the centrifugal tendency resulting from the rapid rotation of the shaft carrying the clutch chamber, 60, will hold the tails of the dogs outward from the axis of rotation, thus keeping the heads withdrawn inward to the full extent to which they are forced by the encounter of the sloping heads of the clutch teeth as mentioned, and effectually preventing any clicking of the dogs during the continued running of the engine after it is started. Flat steel springs, 64, are provided acting on the dogs, respectively, for forcing their heads outward for engagement with the clutch teeth of the drum; and the weight of the tails of the dogs is designed to be such that the centrifugal force operating upon them will overcome, not only the centrifugal force operating upon the heads of the dogs, but also the additional force of the springs, and hold the dogs disengaged as stated.

I claim:—

1. In combination with a starter casing, an engine-connected starter main shaft; a motor spring in the casing coiled about the axis of said main shaft; a speed-reducing train from the starter main shaft to the winding end of the power spring, all the members of said train having rotation about the axis of said main shaft and having their intermeshings within a closely limited transaxial zone, the final driven gear of said train having rigid with it and extending laterally from it a drum, the power spring being attached to and wound about said drum.

2. In combination with a starter casing, an engine-connected starter main shaft; a motor spring in the casing coiled about the axis of said main shaft; a speed-reducing train from the starter main shaft to the winding end of the power spring, the final driven gear of said train having rigid with it and extending laterally from it a drum, the power spring being attached to and wound about said drum, and a one-way driving clutch connection between said drum and the starter main shaft located within the spring-encompassed portion of said drum.

3. In combination with a starter casing, an engine-connected starter main shaft; a motor spring in the casing coiled about the axis of said main shaft; a speed-reducing train from the starter main shaft to the winding end of the power spring, the final driven gear of said train having rigid with it and extending laterally from it a drum, the power spring being attached to and wound about said durm, one-way driving clutch connections between said drum and the starter main shaft arranged for driving said shaft from said drum in the unwinding movement.

4. In combination with a starter casing, an engine-connected starter main shaft; a motor spring in the casing coiled about the axis of said main shaft; a speed-reducing train from the starter main shaft to the winding end of the power spring, the final driven gear of said train having integral with it a hub extended laterally and constituting a drum for attaching said winding end of the spring; one-way driving clutch connections between said drum and the starter main shaft arranged for driving said shaft from said drum in the unwinding movement, said clutch connections being located within the spring-encompassed portion of said drum.

5. In combination with a starter casing, an engine-connected starter main shaft; a motor spring in the casing coiled about the axis of said main shaft; a speed-reducing train from the starter main shaft to the winding end of the power spring, all the members of said train having rotation about the axis of said main shaft and having their intermeshings within a closely limited trans-axial zone, the final driven gear of said train having integral with it a hub extended laterally from said zone and constituting a drum for attaching the winding end of the power spring; one-way driving clutch connections between said drum and the starter main shaft, said clutch connections being located within the spring-encompassed portion of said drum.

6. In combination with a starter casing, an engine-connected starter main shaft; a motor spring in the casing coiled about the axis of said main shaft; a speed-reducing train from the starter main shaft to the winding end of the power spring, all the members of said train having rotation about the axis of said main shaft and having their intermeshing within a closely limited trans-axial zone, the final driven gear of said train having rigid with it an extending laterally from it a drum, the power spring being attached to and wound about said drum; one-way driving clutch connections between said drum and the starter main shaft, arranged for driving said shaft from said drum in the unwinding movement, said clutch connections being located within the spring-encompassed portion of said drum.

7. In combination with a starter casing, an engine-connected starter main shaft; a motor spring in the casing coiled about the axis of the engine-connected shaft; a planetary speed-reducing gear train whose prime gear has one-way driving clutch connections with the engine-connected shaft and whose final driven gear has rigid with it and extending laterally from it a drum, the power spring being attached to and wound about said drum, and one-way driving clutch connections between the drum and the engine-connected shaft located within the spring-encompassed portion of said drum.

8. In combination with a starter casing, an engine-connected shaft in said casing; a motor spring; a drum on which it is wound; a one-way driving clutch within the drum connecting the latter to the engine connected shaft for starting said shaft by the unwinding of the spring; said clutch comprising pivoted dogs carried by the shaft, and ratchet teeth on the inside of the drum engaged upon radially outward movement of the clutch heads of the dogs, said dogs having tails extended at the opposite sides of their pivots from the clutching heads, and weighted for centrifugal effect when the shaft attains speed; whereby the dogs are centrifugally held out of engagement with the drum when the speed of the shaft overruns the drum.

9. In combination with a starter casing, the engine-connected shaft in the casing; a motor spring in the casing; a speed-reducing gear train from the engine-connected shaft to the spring for winding it up, comprising an internally-toothed final driven gear which is supported wholly exteriorly by journal bearings provided for it on the casing.

10. In combination with a starter casing, the engine-connected shaft in the casing; a motor spring in the casing; a speed-reducing gear train from the engine-connected shaft to the spring for winding it up, comprising an internally-toothed final driven gear having rigid with it and extending laterally from it a drum, the motor spring being attached to and wound upon said drum, said final driven gear being supported exteriorly by journal bearings provided for it, one of said bearings being proximate to the plane of the internal gear teeth at one side of the motor spring, and the other being at the end of the drum remote from said plane at the opposite side of the motor spring.

11. In combination with a starter casing, the engine-connected shaft in the casing; a motor spring in the casing; a speed-reducing gear train from the engine-connected shaft to the spring for winding it up, comprising an internally toothed master gear having exterior bearings on the casing; an internally toothed final driven gear having an exterior bearing on the casing; a prime driving gear having one bearing on the casing and another bearing on the final driven gear; all said gears being co-axial with the engine-connected shaft, said shaft having one bearing within the prime driving gear and another within the final driven gear.

12. In combination with a starter casing, the engine-connected shaft in said casing; a motor spring in the casing; a speed-reducing gear train from the engine-connected shaft to the spring for winding it up, comprising co-axial with the engine connected shaft a tubular prime driving gear having an exterior bearing in the casing, and an interior bearing for the engine-connected shaft, both said bearings being in substantially the same trans-axial plane.

13. In combination with a starter casing, the engine-connected shaft in the casing; a motor spring in the casing; a speed-reducing gear train from the engine-connected shaft to the spring for winding it up, comprising an internally-toothed final driven gear having an exterior bearing in the casing, and a tubular prime driving gear co-axial therewith having an exterior bearing in the final driven gear, said bearings being in substantially the same trans-axial plane.

14. In combination with a starter casing, the engine-connected shaft in the casing; a motor spring in the casing; a speed-reducing gear train from the engine-connected shaft to the spring for winding it up, comprising an internally-toothed master gear having exterior ball bearings in the casing, and an internally-toothed final driven gear having an exterior ball bearing on and interiorly of the master gear, said ball bearings being on directly opposite sides of the master gear.

15. In combination with a starter casing, the engine-connected shaft in the casing; a motor spring in the casing; a speed-reducing gear train from the engine-connected shaft to the spring for winding it up, comprising an internally-toothed master gear having exterior bearings on the casing; an internally-toothed final driven gear having exterior ball bearings on the casing and on the master gear; a prime driving gear having a bearing on the casing, and another bearing on the final driven gear, all said gears being co-axial with the engine-connected shaft, said shaft having a bearing within the prime driving gear, and another bearing within the final driven gear.

16. In combination with a starter casing, the engine-connected shaft in the casing; a motor spring in the casing; a speed reducing gear train from the engine-connected shaft to the spring for winding it up, comprising an internally toothed final driven gear having exterior bearings in the casing, and a prime driving gear co-axial therewith having an exterior bearing in the casing at one end, and another exterior bearing in the final driven gear at the other end.

17. In combination with a starter casing, the engine-connected shaft in the casing; a motor spring in the casing; a speed-reducing gear train from the engine-connected shaft to the spring for winding it up, comprising an internally-toothed master gear having an exterior bearing in the casing at one side; an internally-toothed final driven gear positioned at the other side of the master gear, the master gear being recessed at said other side to admit said final driven gear within it, and a ball bearing interposed between three seats, one of which is exterior with respect to the final driven gear, another of which is interior with respect to the master gear, and a third of which is in the casing exterior to the other two.

18. In combination with a starter casing, the engine-connected shaft in the casing; a motor spring in the casing; a speed-reducing gear train from the engine-connected shaft to the spring for winding it up, comprising an internally-toothed master gear having an exterior bearing in the casing, and recessed at the opposite side, and an interiorly-toothed final driven gear co-axial with the master gear and entered into said recess so as to be substantially encompassed by said master gear, and a bearing for the master gear against the casing at the margin of said encompassing part on the master gear.

19. In combination with a starter casing, the engine-connected shaft in the casing; a motor spring in the casing; a speed-reducing gear train from the engine-connected shaft to the spring for winding it up, comprising a master gear journaled in the casing, and means for locking it against rotation, and for releasing it to permit it to rotate; and an interiorly-toothed final driven gear having an exterior bearing in the casing and in said master gear, and having rigid with it and extended laterally away from the plane of said bearing to the opposite side thereof from the master gear a drum upon which the motor spring is wound and to which the inner end thereof is attached for winding, and a bearing in the casing for the remote end of said hub beyond the motor spring.

20. In combination with a starter casing, an engine-connected starter main shaft; a motor spring in the casing coiled about the axis of the engine-connected shaft; a planetary speed-reducing gear train to whose final driven gear one end of the spring is operatively connected, and a prime driving gear having one-way-driving clutch connections with the engine-connected shaft; a master gear and means for holding it non-rotatable in the casing, said final driven gear and said master gear being both internal gears of the same diameter and different number of teeth, the prime driving gear being co-axial with said internal gears and within the same, and a planet pinion meshing with both said internal gears, and with said prime driving gear and floating between said driving gear and said internal gears, being positioned between them solely by its intermeshing with them.

21. In combination with a starter casing, an engine-connected starter main shaft; a motor spring in the casing coiled about the axis of the engine-connected shaft; a final driven gear having rigid with it and extended laterally from it a drum, the motor spring being attached to and wound about said drum; a one-way driving clutch connected between the drum and the engine-connected shaft; a master gear and means for holding it non-rotatable in the casing; a prime driving gear operatively connected with the engine-connected shaft, said master gear and said final driven gear being both internal gears of the same diameter and different number of teeth, and the prime driving gear being co-axial therewith and located within them, and a flanged pinion intermeshing with said prime driving and said internal gears, and positioned between them solely by its intermeshing engagement therewith.

22. In combination with a starter casing, an engine-connected starter main shaft in the casing; a motor spring in the casing coiled about the axis of the main shaft; a speed-reducing train from the starter main shaft to the winding end of the power shaft, the prime driving gear of said train being in the form of a sleeve encompassing the engine-connected main shaft at the end remote from the engine connection of said shaft, and one-way driving clutch connections between said engine-connected shaft and said prime driving gear, consisting of a ratchet toothed flange on the end of the engine-connected shaft having its teeth facing toward the engine-connected end and coöperating ratchet teeth on the proximate end of said sleeve prime driving gear.

23. In combination with a starter casing, an engine-connected starter main shaft in the casing; a motor spring in the casing coiled about the axis of the main shaft; a speed-reducing train from the starter main shaft to the winding end of the power shaft, the prime driving gear of said train being in the form of a sleeve encompassing the engine-connected main shaft at the end remote from the engine connection of said shaft, and one-way driving clutch connections between said engine-connected shaft and said prime driving gear, consisting of a ratchet-toothed flange on the end of the engine-connected shaft having its teeth facing toward the engine-connected end and coöperating ratchet teeth on the proximate end of said sleeve prime driving gear; said engine-connected shaft having limited range of longitudinal movement in its bearings, and a spring re-acting upon said shaft for thrusting it in the direction for disengaging said clutch.

24. In combination with a starter casing, the engine-connected shaft in the casing; a motor spring in the casing; a winding up train from the engine-connected shaft to the spring; a one-way driving clutch connection between the engine-connected shaft and the final or spring-connected gear of said train; a disengageable clutch connection between the engine-connected shaft and the prime driving gear of said train, the engine-connected shaft being longitudinally movable for engaging and disengaging said last mentioned clutch; a sleeve which is mounted slidably on the engine-connected shaft having a threaded connection with the final or spring-connected gear of said train, and means on the frame for holding said sleeve non-rotatable with respect to the casing, and permitting it to slide, a second sleeve on the engine-connected shaft on which said first mentioned sleeve is mounted for sliding between stops thereon, a spring interposed between the threaded sleeve and the stop at the rear end, said second sleeve being arranged for pushing on the engine-connected shaft in the direction for disengaging from the driving gear of said train, and having an annular groove for engagement of a detent, a spring-pressed plunger mounted in the final driven or spring-connected gear, constituting a detent engaging said annular groove for yieldingly resisting the thrust of said sleeve for pushing the engine-connected shaft in clutch-disengaging direction, said sleeve having a second shallower annular groove adjacent to the first, adapted to receive and lodge said detent at the limit of said thrusting movement of the sleeve.

25. In an engine starter, in combination with an engine-connected shaft, a motor spring and a train by which the engine-connected shaft winds the spring by the forward running of the engine, said train comprising a master wheel which must be held stationary in order to wind the spring; one-way-driving clutch connections between the spring and the engine-connected starter shaft for rotating said shaft in the direction of forward running of the engine by the running down of the spring, and means for holding the master wheel against rotation in one direction only, said wheel being free to revolve in the opposite direction, said train being adapted to rotate the master wheel in said opposite direction by the reverse rotation of said engine-connected starter shaft.

26. In combination with a starter casing, an engine-connected main starter shaft; a motor spring coiled about the axis of said shaft having its outer end fast to the casing, and a gear train of which a final element is connected to the inner end of the spring for winding the spring by the forward running of the engine shaft, said train comprising a master wheel which must be held stationary in order to wind the spring, connections between the spring-attached element of said train and the starter main shaft for rotating the latter in the direction of forward running of the engine by the running down of the spring; means for holding the master wheel against rotation in one direction only, said wheel being free to revolve in the opposite direction, the train which connects the master wheel with the starter main shaft being adapted for rotating the spring-attached train element in the opposite direction from said starter main shaft.

27. In combination with a starter casing, an engine-connected starter main shaft; a motor spring in the casing coiled about the axis of the engine-connected shaft; a planetary speed-reducing gear train comprising a final driven gear to which one end of the spring is operatively connected, a prime driving gear having one-way driving clutch connections with the engine-connected shaft, a master gear and a planet pinion; means for holding the master gear against rotation in one direction only, said master gear being otherwise free to rotate in either direction, said final driven gear and said master gear being both internal gears of the same diameter, the final driven gear having a less number of teeth than the master gear, the planet pinion meshing with both said internal gears and with the prime driving gear, whereby the final driven gear of the planetary train is rotated in the opposite direction from the starter main shaft when the master gear is held non-rotatable.

28. In combination with a starter casing, an engine-connected starter main shaft; a motor spring in the casing coiled about the axis of the engine-connected shaft; a planetary speed-reducing train comprising a prime driving gear which is rotated by the starter main shaft in the forward running of said shaft, a master gear and means for holding it against rotation in one direction, said gear being free to rotate in the opposite direction in the casing, a final driven gear and a planet pinion, the relation of the elements of said planetary train being such that the final driven gear rotates in the opposite direction from the prime driving gear, said final driven gear being operatively connected with one end of the spring for winding it and for being rotated by the spring in unwinding.

29. In an engine starter, in combination with an engine-connected shaft, a motor spring and a train by which the engine-connected shaft winds the spring by the forward running of the engine, comprising a one-way driving clutch connection and a master wheel which must be held stationary in order to wind the spring, and means for holding the master wheel against rotation in one direction only, said wheel being free to revolve in the opposite direction, said train being adapted to rotate the master wheel in said opposite direction by the reverse rotation of said engine-connected starter shaft.

30. In an engine starter, in combination with an engine-connected shaft, a motor spring and a train by which the engine-connected shaft winds the spring by the forward running of the engine, said train comprising a master wheel which must be held stationary in order to wind the spring, and means for holding the master wheel against rotation in one direction only, said wheel being free to revolve in the opposite direction, said train being adapted to rotate the master wheel in said opposite direction by the reverse rotation of said engine-connected starter shaft.

In testimony whereof I have hereunto set my hand at Chicago, Illinois, this 21st day of January, A. D. 1916.

JOHN K. STEWART.